US011449518B2

(12) United States Patent
Walters et al.

(10) Patent No.: US 11,449,518 B2
(45) Date of Patent: Sep. 20, 2022

(54) NEURAL NETWORK-BASED DOCUMENT SEARCHING SYSTEM

(71) Applicant: Capital One Services, LLC, McLean, VA (US)

(72) Inventors: Austin Walters, Savoy, IL (US); Vincent Pham, Champaign, IL (US); Jeremy Edward Goodsitt, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 254 days.

(21) Appl. No.: 16/842,809

(22) Filed: Apr. 8, 2020

(65) Prior Publication Data

US 2021/0319020 A1 Oct. 14, 2021

(51) Int. Cl.
*G06F 7/00* (2006.01)
*G06F 16/2458* (2019.01)
*G06N 3/08* (2006.01)
*G06N 3/04* (2006.01)
*G06F 16/248* (2019.01)

(52) U.S. Cl.
CPC ........ *G06F 16/2468* (2019.01); *G06F 16/248* (2019.01); *G06N 3/0454* (2013.01); *G06N 3/08* (2013.01)

(58) Field of Classification Search
CPC .... G06F 16/2468; G06F 16/248; G06F 40/47; G06F 40/242; G06F 40/44; G06N 3/0454; G06N 3/08; G06N 3/084
See application file for complete search history.

(56) References Cited

U.S. PATENT DOCUMENTS

| 6,598,047 | B1 | | 7/2003 | Russell et al. | |
|---|---|---|---|---|---|
| 6,738,760 | B1 | | 5/2004 | Krachman | |
| 7,496,548 | B1 | | 2/2009 | Ershov | |
| 10,839,164 | B1 | * | 11/2020 | Shorter | G16H 10/20 |
| 2004/0167768 | A1 | * | 8/2004 | Travieso | G06F 16/95 |
| | | | | | 704/270.1 |
| 2014/0006320 | A1 | * | 1/2014 | Linker | G06N 5/02 |
| | | | | | 901/3 |
| 2017/0139905 | A1 | * | 5/2017 | Na | G06N 3/08 |
| 2018/0143975 | A1 | * | 5/2018 | Casal | G06F 40/51 |
| 2019/0042551 | A1 | * | 2/2019 | Hwang | G06N 3/0454 |

FOREIGN PATENT DOCUMENTS

CN 110692061 A 1/2020

\* cited by examiner

*Primary Examiner* — Mohammad A Sana
(74) *Attorney, Agent, or Firm* — Troutman Pepper Hamilton Sanders LLP; Christopher J. Forstner; John A. Morrissett (57) ABSTRACT

Systems for performing methods for searching documents are disclosed. The system may receive a first document comprising textual content, summarize the textual content using a first neural network, and translate the summarized textual content into translated content (e.g., content translated into Lojban) using a second neural network. The system may also conduct a fuzzy search of a database using the translated content for similar translated content from a plurality of documents and output results of the fuzzy search.

19 Claims, 6 Drawing Sheets

NEURAL NETWORK-BASED DOCUMENT SEARCHING SYSTEM

FIELD OF INVENTION

The present disclosure relates to systems and methods for searching for documents and more particularly to neural network (NN)-based systems and methods that summarizes content into a logical language (e.g., Lojban), searches for other documents based on the summarized content, and outputs the results of that search.

BACKGROUND

Searching for a document that has a similar intent or meaning as what you are looking for is difficult. Existing search methods use literal text to find the same literal text in other documents, file name, or other metadata. While a user may obtain search results with the same words that he entered into a search query, these search results may vary widely from the true intent of a search. Put another away, existing search methods fail to take into account the meaning of a document or search query when conducting a search. Therefore, these limitations, among others, make it difficult to find a document that has a similar intent or meaning to what a user is searching for.

Accordingly, there is a need for systems and methods for effectively taking the meaning of a document or search query into account when conducting a search for other documents. Embodiments of the present disclosure are directed to this and other considerations.

SUMMARY

Disclosed embodiments provide systems and methods for searching for documents.

Consistent with the disclosed embodiments, various methods and systems are disclosed. In an embodiment, a system performing a method for searching for documents is disclosed. The system may receive a first document comprising textual content, summarize the textual content using a first neural network, and translate the summarized textual content into translated content (e.g., content translated into Lojban or another logical language) using a second neural network. The system may also conduct a fuzzy search of a database using the translated content for similar translated content from a plurality of documents and output results of the fuzzy search.

In an embodiment, a system performing another method for searching for documents is disclosed. The system may receive a first document comprising textual content, summarize the textual content using a first neural network, and translate the summarized textual content into translated content (e.g., content translated into Lojban or another logical language) using a second neural network. The system may also generate tokens from the translated summarized textual content, map the tokens to an encoding, generate an embedding based on the encoding using a third neural network, compare the embedding against similar translated content from a plurality of documents (the similar translated content was previously stored in a database), and output results of the comparison.

In an embodiment a system performing another method for searching for documents is disclosed. The system may receive text, summarize the text using a first neural network, and translate the summarized text into translated content in an intermediate language using a second neural network. The system may then identify one or more documents having similar content to the translated content by conducting a fuzzy search using the translated content, and output results of the fuzzy search.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

As used herein, the term "legalese" refers to the specialized language of the legal profession. The goal of this disclosure is to translate legalese to plain English.

This disclosure discusses a neural network (NN). It is envisioned that the NN could be a recurrent neural network (RNN), a convolutional neural network (CNN), a recurrent convolutional neural network (RCNN), a deep learning neural network, or other variant.

Reference will now be made in detail to example embodiments of the disclosed technology, examples of which are illustrated in the accompanying drawings and disclosed herein. Wherever convenient, the same references numbers will be used throughout the drawings to refer to the same or like parts.

Figure 1:
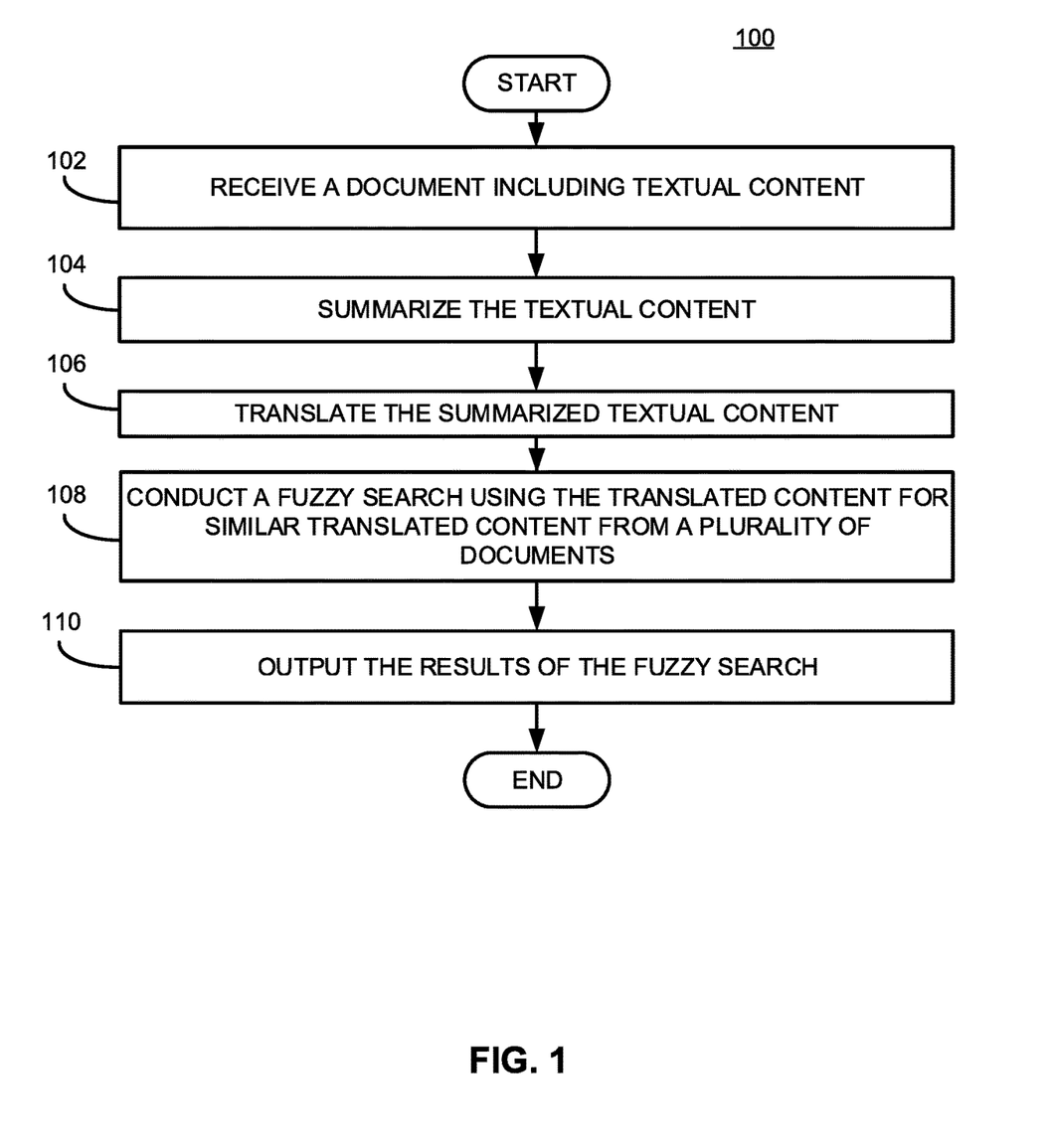
FIG. 1 is a flowchart of a method for conducting a fuzzy search for documents using summarized content of a document according to an example embodiment.

FIG. 1 shows a flowchart of a method 100 for conducting a fuzzy search for documents using summarized content of a document according to an example embodiment. Method 100 may be performed by a service provider system 420 or computing device 410 (both described in more detail with respect to FIGS. 4, 5, and 6 below). For ease of reference but by no means limitation, the method 100 is described below as being performed by the service provider system 420.

In block 102, the service provider system may receive a first document including textual content. The document may by any electronic document such as a text file, a word processing file, (e.g., a Microsoft® Word document), a presentation file (e.g., Microsoft® PowerPoint), a Portable Document Format (PDF), a spreadsheet file (e.g., Microsoft® Excel), an email. Regardless of the exact format used, the first document must contain text. The text may correspond to a report, a memorandum, a book, an article, etc. The service provider system may receive the first document via a network from a computing device. For example, a user of a computing device may upload an article in Word format to a website associated with the service provider system. In other embodiments, the user of a computing device texts or emails the article to an email address or phone number associated with the service provider system such that the service provider system receives the article.

In block 104, the service provider system may summarize the textual content using a first neural network (e.g., a recurrent neural network (RNN), a convolutional neural network (CNN), a transformer, or a combination thereof). Put another way, the service provider system digests all the textual content of the first document and outputs a summary for further processing. The first neural network is specifically trained to summarize text (e.g., English text) by feeding the first neural network text with corresponding summarized text and iterating the process many times. In some embodiments, the service provider system may use abstractive summarization techniques where the system select words from textual content or from storage via compiled from training based on a semantic understanding to create the summary of the textual content. In other embodiments, the system may use extractive summarization techniques where the system, using different algorithms, may assign weights to important sentences, rank the sentences, and then select the sentences with the higher ranks. Regardless of the method used, the summarization step is important because it reduces the data requirements on the system improving the later search technique.

In block 106, the service provider system may translate the summarized textual content into translated content using a second neural network (e.g., an RNN, a CNN, a transformer, or a combination thereof). The translated content may be an intermediate language (e.g., Lojban). Put another way, the service provider system converts the summary of the first document from a first language (English) to a second language (e.g., Lojban) different from the first language. The second neural network is specifically trained to translate from a first language (e.g., English) to a second language (e.g., Lojban) by feeding the neural network text from the first language with matching text from a second language and iterating the process many times. In some embodiments, the service provider system may store the translated content in a database. The advantage of using an intermediary language is that it enables the service provider system to conduct a document search that is both (i) language independent (all languages translate into it) and (ii) and allows the service provider system to optimize the embedding for only that language.

In block 108, the service provider system may conduct a fuzzy search using the translated content for similar translated content from a plurality of documents. The similar translated content from the plurality of documents may be previously stored in a database. For example, the service provider system may have previously summarized all documents stored in the database and translated the summaries. The summaries and translations of those summaries may be stored in the database as well that way a user can search through all the document summaries in the intermediate language. The fuzzy search locates document summaries that are approximately relevant to a search query (e.g., summary of the first document in the intermediate language) In other words, the results and the search query does not have to have exact correspondence in words, spelling, or grammar to return relevant results. A simple example is that a search query of "aple" might return search results for "apple" instead of "aple". The fuzzy search may be conducted using a fuzzy search technique selected from Bitap, n-gram, Levenshtein Distance, BK-tree, and Soundex.

In some embodiments, conducting the fuzzy search by the service provider system may include generating tokens of the translated content and fuzzy searching the tokens against the translated content form a plurality of documents. Put another way, the fuzzy search may use n-grams or Soundex algorithms. For example, if the word "cheese" translated into intermediate language was "cirrla," that word would then be broken into "cir" "rla" (two 3 letter n-grams, tri-grams, or tokens). Those n-grams would then be used to compare against words and/or sentences in the plurality of documents. In some embodiments, the documents would be ranked by the percent match to the n-grams.

In block 110, the service provider system may output results of the fuzzy search. In some embodiments, the results may be transmitted to a computing device (e.g., a user device) for display. Regardless, the service provider system determines the results of the fuzzy search and provides the data for display. The results may be presented in a list and each entry of the list may include some or all of the following: a link to a corresponding document, a summary of the document in English or other native language, the translation of the summary of each of the plurality of documents, and a degree of relevance (e.g., expressed as a percentage, ratio, or rank (e.g., 1-10 with 10 being the most relevant). The results may be ordered such that the most entry is listed first (e.g., the top of the list) followed by the second most relevant entry and so on until there are no more relevant entries or all documents in the database are listed.

Figure 2:
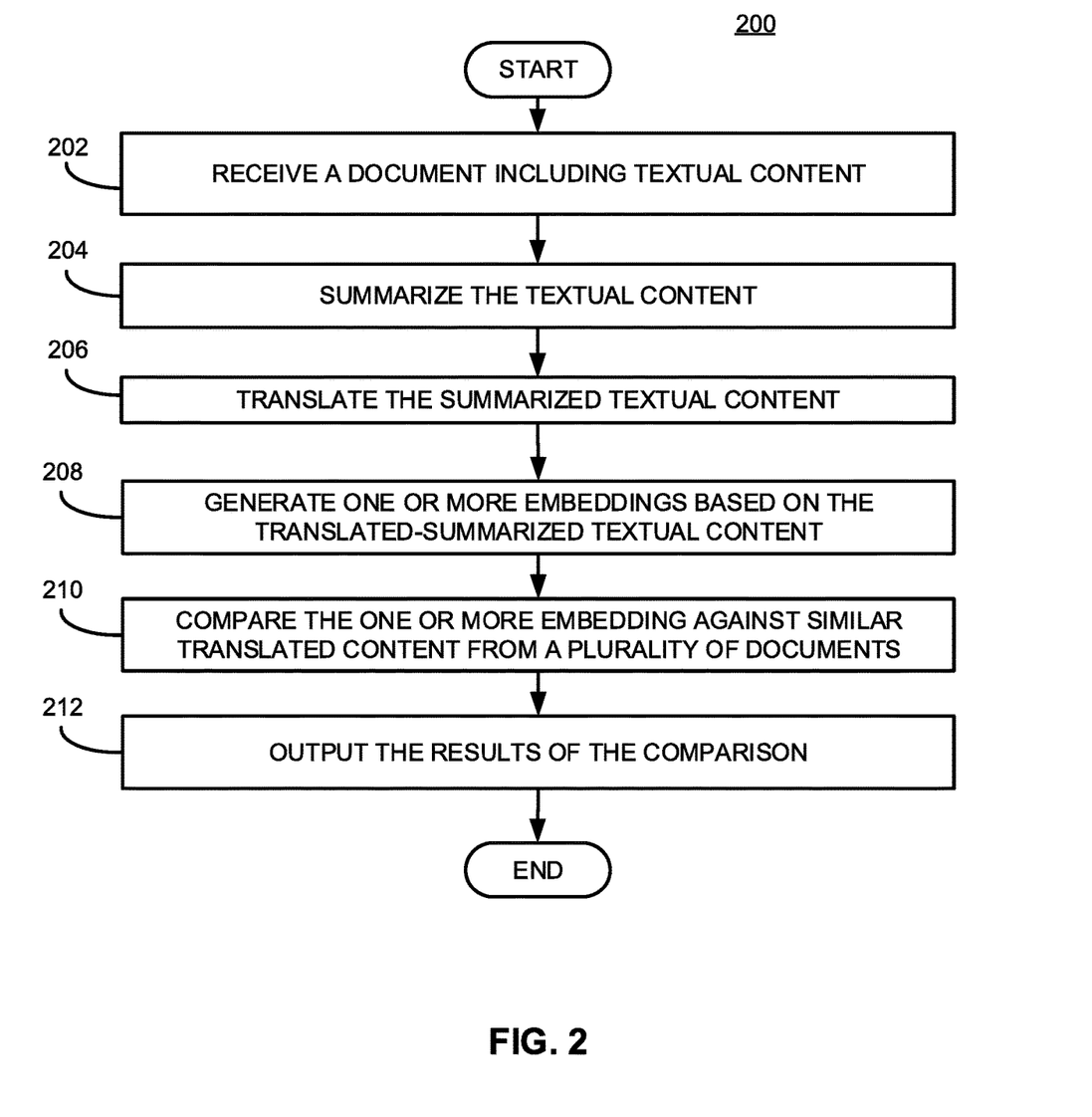
FIG. 2 is a flowchart of a method for conducting a search for documents using summarized content of a document and embedding according to an example embodiment.

FIG. 2 shows a flowchart of a method 200 for conducting a search for documents using summarized content of a document according to an example embodiment. Method 200 may be performed by a service provider system 420 or computing device 410 (both described in more detail with respect to FIGS. 4, 5, and 6 below). For ease of reference but by no means limitation, the method 200 is described below as being performed by the service provider system 420.

Method 200 is similar to method 100 except that method 200 includes blocks 208, and 210, which are different from any of the method blocks in method 100. However, blocks 202, 204, 206, and 212 are substantially similar to blocks 102, 104, 106, and 110 respectively, and incorporate by reference the descriptions referring to blocks 102, 104, 106, 110, above. Thus, for ease of reference and conciseness, the descriptions of blocks 102, 104, 104, 106, and 110 will not be repeated for blocks 202, 204, 206, and 212.

In block 202, the description of block 102 above is incorporated herein.

In block 204, the description of block 104 above is incorporated herein.

In block 206, the description of block 106 above is incorporated herein.

In block 208, the service provider system may generate one or more sembedding based on the translated summarized textual content using a third neural network (e.g., an RNN, a CNN, a transformer, autoencoder, or a combination thereof). In some embodiments, the service provider system creates an embedding for each sentence in the summarized translated textual content.

In block 210, the service provider system may compare the embedding against similar translated-embedded content from a plurality of documents. The similar translated content may be previously stored in a database, but not necessarily.

In block 212, the description of block 110 above is incorporated herein.

Figure 3:
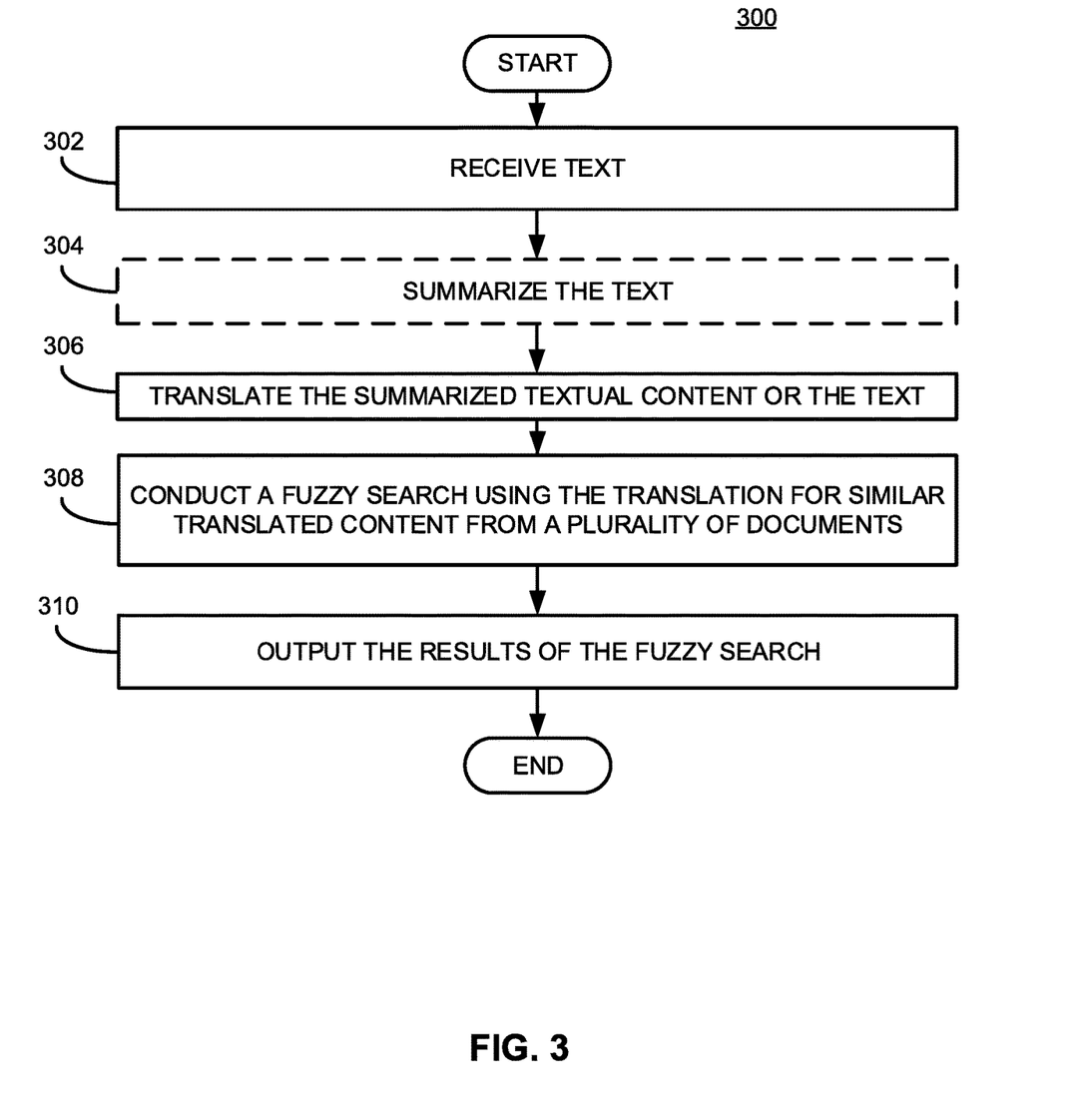
FIG. 3 is a flowchart of a method for conducting a fuzzy search for documents using summarized text according to an example embodiment.

FIG. 3 shows a flowchart of a method 300 for conducting a fuzzy search for documents according to an example embodiment. Method 200 may be performed by a service provider system 420 or computing device 410 (both described in more detail with respect to FIGS. 4, 5, and 6 below). For ease of reference but by no means limitation, the method 200 is described below as being performed by the service provider system 420.

Method 300 is similar to method 100 except that method 300 includes block 302 and uses an optional block 304. However, blocks 306, 308, and 310 are substantially similar to blocks 106, 108, and 110 respectively, and incorporate by reference the descriptions referring to blocks 106, 108, and 110, above. Thus, for ease of reference and conciseness, the descriptions of blocks 306, 308, and 310 will not be repeated for blocks 106, 108, and 110.

In block 302, the service provider system may receive text. This text may be a single letter, word, sentence, paragraph, or an entire document with more than one paragraph. The text may be typed into a search query box similar via user input from a keyboard, touch screen, or other type of input. Alternatively, the text may be pulled from a document such as a Microsoft® Word document. Image recognition techniques (e.g., optical character recognition) may be used to pull text from a PDF document or an image. Regardless, the text may be sent to the service provider system from the computing device (e.g. user device) or from some other device.

In optional block 304, the service provider system may summarize the text. However, in other embodiments, the service provider system does not summarize the text. For example, if the text entered is only a few words, the service provider system may not summarize the text and may simply move to block 306—translating the text or the summarized text.

In block 306, the description of block 106 above is incorporated herein.

In block 308, the description of block 108 above is incorporated herein.

In block 310, the description of block 110 above is incorporated herein.

Figure 4:
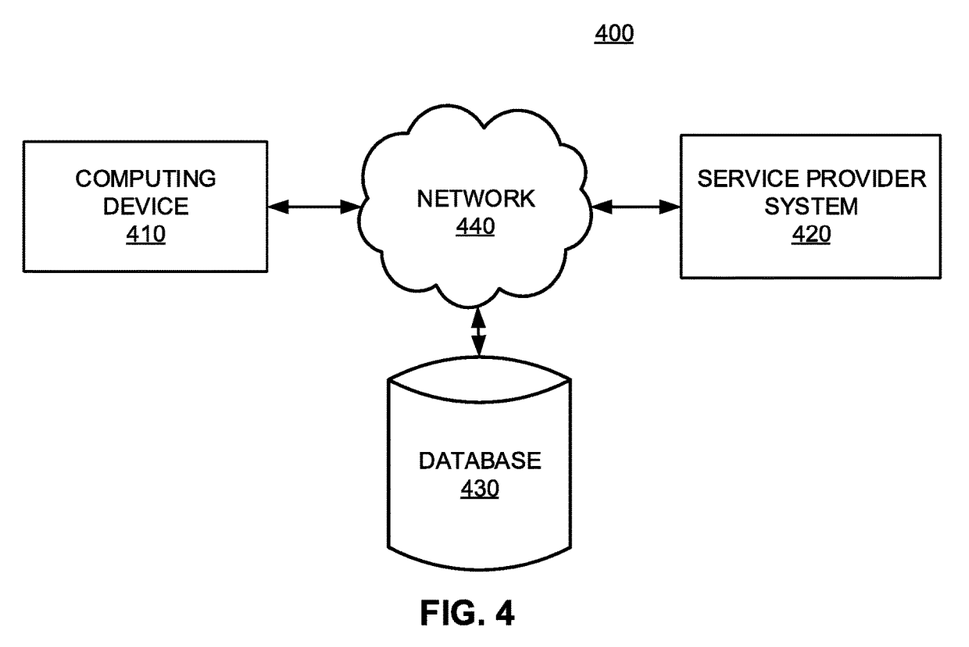
FIG. 4 is a diagram of an example system environment that may be used to implement one or more embodiments of the present disclosure.

FIG. 4 is a diagram of an example system environment that may be used to implement one or more embodiments of the present disclosure. The components and arrangements shown in FIG. 4 are not intended to limit the disclosed embodiments as the components used to implement the disclosed processes and features may vary.

In accordance with disclosed embodiments, system 400 may include a service provider system 420, a computing device 410, and a database 430 all in communication via network 440. In some embodiments, service provider system 110 may also be in communication with various databases that are not directly connected to the network 440. Computing device 410 may be a mobile computing device (e.g., a smart phone, tablet computer, smart wearable device, portable laptop computer, voice command device, wearable augmented reality device, or other mobile computing device) or a stationary device (e.g., desktop computer).

Network 440 may be of any suitable type, including individual connections via the internet such as cellular or WiFi networks. In some embodiments, network 105 may connect terminals using direct connections such as radio-frequency identification (RFID), near-field communication (NFC), Bluetooth™, low-energy Bluetooth™ (BLE), WiFi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 5:
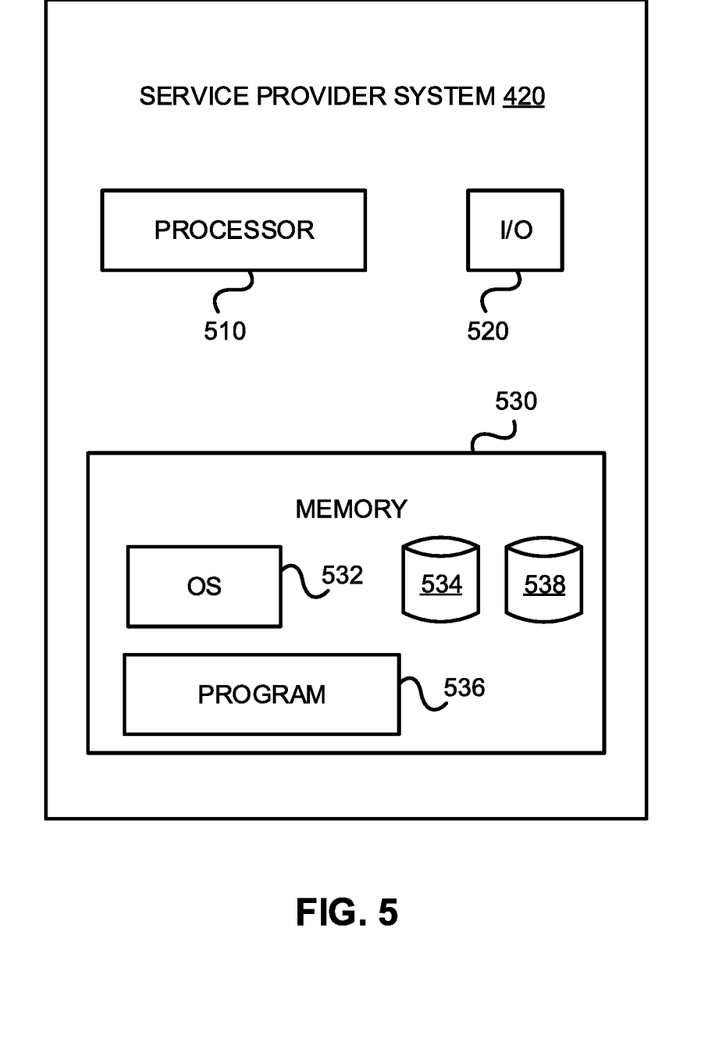
FIG. 5 is a component diagram of a service provider system according to an example embodiment.

An example embodiment of service provider system 420 is shown in more detail in FIG. 5. Computing device 410 may have a similar structure and components that are similar to those described with respect to service provider system 420. As shown, service provider system 420 may include a processor 510, an input/output ("I/O") device 520, a memory 530 containing an operating system ("OS") 532 and a program 536. For example, service provider system 420 may be a single server or may be configured as a distributed computer system including multiple servers or computers that interoperate to perform one or more of the processes and functionalities associated with the disclosed embodiments. In some embodiments, service provider system 420 may further include a peripheral interface, a transceiver, a mobile network interface in communication with processor 510, a bus configured to facilitate communication between the various components of the service provider system 420, and a power source configured to power one or more components of service provider system 420.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 510 to communicate with other devices via wired or wireless networks, whether local or wide area, private or public, as known in the art. A power source may be configured to provide an appropriate alternating current (AC) or direct current (DC) to power components.

As described above, service provider system 420 may be configured to remotely communicate with one or more other devices, such as computer device 410 and database 430. According to some embodiments, service provider system 420 may summarize textual content or text, translate the summarized textual content or text into an intermediate language, conduct a fuzzy search using the translated content, and output results of the fuzzy search.

Processor 610 may include one or more of a microprocessor, microcontroller, digital signal processor, co-processor or the like or combinations thereof capable of executing stored instructions and operating upon stored data. Memory 530 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 530.

Processor 510 may be one or more known processing devices, such as a microprocessor from the Pentium™ family manufactured by Intel™ or the Turion™ family manufactured by AMD™. Processor 510 may constitute a single core or multiple core processor that executes parallel processes simultaneously. For example, processor 510 may be a single core processor that is configured with virtual processing technologies. In certain embodiments, processor 510 may use logical processors to simultaneously execute and control multiple processes. Processor 510 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Service provider system 420 may include one or more storage devices configured to store information used by processor 510 (or other components) to perform certain functions related to the disclosed embodiments. In one example, service provider system 420 may include memory 530 that includes instructions to enable processor 510 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, service provider system 420 may include memory 530 that includes instructions that, when executed by processor 510, perform one or more processes consistent with the functionalities disclosed herein. Methods, systems, and articles of manufacture consistent with disclosed embodiments are not limited to separate programs or computers configured to perform dedicated tasks. For example, service provider system 420 may include memory 530 that may include one or more programs 536 to perform one or more functions of the disclosed embodiments. Moreover, processor 510 may execute one or more programs 536 located remotely from service provider system 420. For example, service provider system 420 may access one or more remote programs 536, that, when executed, perform functions related to disclosed embodiments.

Memory 530 may include one or more memory devices that store data and instructions used to perform one or more features of the disclosed embodiments. Memory 530 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 530 may include software components that, when executed by processor 610, perform one or more processes consistent with the disclosed embodiments. In some embodiments, memory 530 may include an image processing database 534 and a neural-network pipeline database 538 for storing related data to enable service provider system 420 to perform one or more of the processes and functionalities associated with the disclosed embodiments.

Service provider system 420 may also be communicatively connected to one or more memory devices (e.g., databases (not shown)) locally or through a network. The remote memory devices may be configured to store information and may be accessed and/or managed by service provider system 420. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Service provider system 420 may also include one or more I/O devices 520 that may include one or more interfaces for receiving signals or input from devices and providing signals or output to one or more devices that allow data to be received and/or transmitted by service provider system 520. For example, service provider system 520 may include interface components, which may provide interfaces to one or more input devices, such as one or more keyboards, mouse devices, touch screens, track pads, trackballs, scroll wheels, digital cameras, microphones, sensors, and the like, that enable service provider system 520 to receive data from one or more users (such as via computing device 410).

In example embodiments of the disclosed technology, service provider system 420 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While service provider system 420 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the service provider system 420 may include a greater or lesser number of components than those illustrated.

Database 430 may store documents and/or a variety of information relating to those documents (e.g., summaries, translations of those summaries, authors, location of the documents, link addresses, etc.). Database 430 may also serve as a back-up storage device and may contain data and information that is also stored on, for example, local databases associated with service provider system 420. Although database 430 is shown as being directly connected to the network 440 it may be indirectly connected to the network 440 through service provider system 420.

Figure 6:
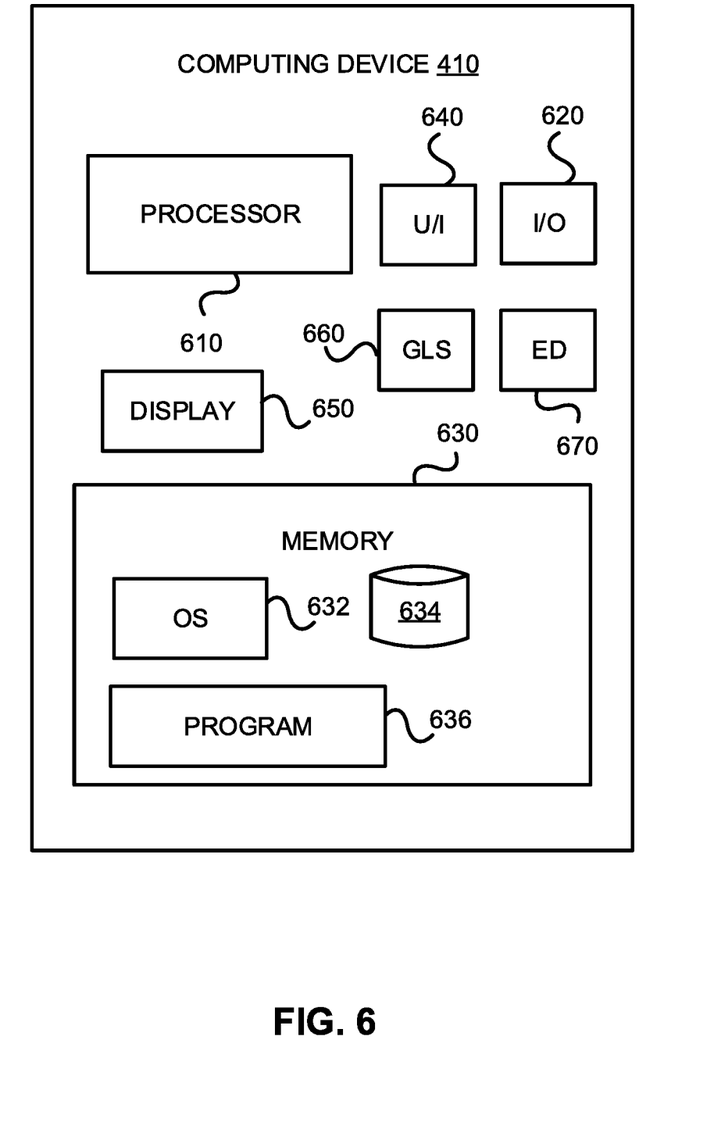
FIG. 6 is a component diagram of a computing device according to an example embodiment.

FIG. 6 shows an example embodiment of computing device 410. As shown, computing device 410 may include input/output ("I/O") device 620 for receiving data from another device (e.g., service provider system 420), memory 630 containing operating system ("OS") 632, program 636, and any other associated component as described above with respect to service provider system 420. Computing device 410 may also have one or more processors 610, a geographic location sensor ("GLS") 660 for determining the geographic location of computing device 410, a display 650 for displaying content such as text, search results, text messages, images, and selectable buttons/icons/links, an environmental data ("ED") sensor 670 for obtaining environmental data including audio and/or visual information, and a user interface ("U/I") device 640 for receiving user input data, such as data representative of a click, a scroll, a tap, a press, or typing on an input device that can detect tactile inputs. User input data may also be non-tactile inputs that may be otherwise detected by ED sensor 640. For example, user input data may include auditory commands. According to some embodiments, U/I device 640 may include some or all of the components described with respect to input/output device 620 above. In some embodiments, environmental data sensor 670 may include a microphone and/or an image capture device, such as a digital camera. Certain implementations provide the advantage of finding documents that have similar meaning or purpose to the search query. Thus, certain implementations provide better search results.

By summarizing a document or search query and then translating the summary to an intermediate language in certain implementations, the system conducts searches faster than if a whole document or long search query is used because the overall data that needs to be searched is reduced. By translating into an intermediate language in certain implementations, the system can more easily conduct cross-language searches. Finally, in certain implementations, embeddings can be improved by translating all documents to one intermediate language to provide a much larger dataset.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Case

The following example use case describes an example of a typical use of searching for document. It is intended solely for explanatory purposes and not in limitation. In one example, a user receives or generates document with text (e.g., an article, a memorandum, etc.) on their portable laptop computer (e.g., computing device 410). Regardless, a user may, via a website on their portable laptop computer (e.g., computing device 410), send or upload the document to the service provider system 420 for processing. In other words, the service provider system 420 receives the document. The service provider system 420 then summarizes textual content of the document using the first trained neural network. The service provider system 420 then translates the summarized textual content into an second language such as Lojban using the second trained neural network. The service provider system 420 then conducts a fuzzy search for similar translated content from a plurality of documents stored in a database using the translated content. The service provider system 420 may output the results of the fuzzy search by transmitting the results to the portable laptop computer (e.g., computing device 410) for display. The results are displayed in a list and each entry of the list may include some or all of the following: a link to a corresponding document, a summary of the document in English or other native language, the translation of the summary of each of the plurality of documents, and a degree of relevance (e.g., expressed as a percentage, ratio, or rank (e.g., 1-10 with 10 being the most relevant). The system may order the results such that the most relevant entry is listed first (e.g., the top of the list) followed by the second most relevant entry and so on until there are no more relevant entries or all documents in the database are listed. For example, if a fuzzy search is conducted the most relevant entry would have a translated summary with the most letters that match the meaning of the translated summary of the search query. As another example, if using embeddings, the most relevant entry would correspond to the entry that has a translated summary that most aligns with the meaning of to the meaning of the translated summary of the search query.

To perform these various exemplary uses cases, in some examples, the system may include one or more processors and a memory in communication with the one or more processors and storing instructions that when executed by the one or more processors, are configured to cause the system to perform steps of a method. The method may include receiving a first document comprising textual content, summarizing the textual content using a first neural network, translating the summarized textual content into translated content using a second neural network, the translated content being in an intermediate language, conducting a fuzzy search using the translated content for similar translated content from a plurality of documents, and output results of the fuzzy search. The similar translated content may be previously stored in a database.

The method may further include storing the translated content in the database.

In the method, the database may include a link to each of the plurality of documents, a summary of each of the plurality of documents, and a translation of the summary of each of the plurality of documents.

In the method, content from the plurality of documents stored in the database may have been previously summarized and translated into the intermediate language.

In the method, conducting the fuzzy search may include comparing the translated content of the document to the translated content of each of the plurality of documents in the database.

In the method, outputting the results of the fuzzy search may include causing a user device to display results of the fuzzy search. The results may include summarized textual content of an associated document of the plurality of documents.

In the method, conducting the fuzzy search may include generating tokens from the translated content and fuzzy searching the generated tokens against the translated content from a plurality of documents.

In the method, the first neural network may include a first recurrent neural network (RNN), a first convolutional neural network (CNN), a transformer, or a combination thereof, and the intermediate language is Lojban.

In the method, the second neural network may include a second recurrent neural network (RNN), a second convolutional neural network (CNN), a transformer, or a combination thereof.

Alternatively, the system may include one or more processors and a memory in communication with the one or more processors and storing instructions that when executed by the one or more processors, are configured to cause the system to perform steps of a method. The method may include receiving a first document comprising textual content, summarizing the textual content using a first neural network, translating the summarized textual content into translated content using a second neural network, the translated content being in an intermediate language, generating tokens from the translated summarized textual content, mapping the tokens to an encoding, generating an embedding based on the encoding using a third neural network, comparing the embedding against similar translated content from a plurality of documents, and outputting results of the comparison. The similar translated content may be previously stored in a database.

The method may further include storing the translated content in the database.

In the method, content from the plurality of documents stored in the database may have been previously summarized and translated into the intermediate language.

In the method, outputting the results of the comparison comprises causing a user device to display the results of the comparison.

In the method, each of the results includes summarized textual content of an associated document of the plurality of documents.

In the method, the intermediate language may be Lojban.

In the method, the first neural network may include a first recurrent neural network (RNN), a first convolutional neural network (CNN), a transformer, or a combination thereof.

In the method, the second neural network includes a second recurrent neural network (RNN), a second convolutional neural network (CNN), a transformer, or a combination thereof, and wherein the third neural network is an autoencoder.

Alternatively, the system may include one or more processors and a memory in communication with the one or more processors and storing instructions that when executed by the one or more processors, are configured to cause the system to perform steps of a method. The method may include receiving text, summarizing the text using a first neural network, translate the summarized text into translated content in an intermediate language using a second neural network, identifying one or more documents having similar content to the translated content by conducting a fuzzy search using the translated content, and outputting results of the fuzzy search.

In the method, the one or more identified documents may be stored in a database and content from the one or more identified documents may have been previously summarized and translated into translated content in the intermediate language.

In the method, conducting the fuzzy search may include comparing the translated content to the translated content of the one or more identified documents in the database.

What is claimed is:

1. A system, comprising:
   one or more processors; and
   memory in communication with the one or more processors and storing instructions that, when executed by the one or more processors, are configured to cause the system to:
   receive a first document comprising textual content;
   summarize the textual content using a first neural network;
   translate the summarized textual content into translated content using a second neural network, the translated content being in an intermediate language;
   generate n-grams for each word of the summarized textual content in the intermediate language;
   conduct a fuzzy search using the generated n-grams for similar translated content from a plurality of documents, wherein the similar translated content was previously stored in a database; and
   output results of the fuzzy search.

2. The system of claim 1, further comprising storing additional instructions that when executed by the one or more processors, are configured to cause the system to store the translated content in the database.

3. The system of claim 1, wherein the database comprises a link to each of the plurality of documents, a summary of each of the plurality of documents, and a translation of the summary of each of the plurality of documents.

4. The system of claim 3, wherein content from the plurality of documents stored in the database has been previously summarized and translated into the intermediate language.

5. The system of claim 4, wherein conducting the fuzzy search comprises comparing the translated content of the document to the translated content of each of the plurality of documents in the database.

6. The system of claim 1, wherein outputting the results of the fuzzy search comprises causing a user device to display results of the fuzzy search, and wherein each of the results comprising summarized textual content of an associated document of the plurality of documents.

7. The system of claim 1, wherein the first neural network comprises a first recurrent neural network (RNN), a first convolutional neural network (CNN), a transformer, or a combination thereof, and the intermediate language is lojban.

8. The system of claim 7, wherein the second neural network comprises a second recurrent neural network (RNN), a second convolutional neural network (CNN), a transformer, or a combination thereof.

9. A system, comprising:
one or more processors; and
memory in communication with the one or more processors and storing instructions that, when executed by the one or more processors, are configured to cause the system to:
receive a first document comprising textual content;
summarize the textual content using a first neural network;
translate the summarized textual content into translated content using a second neural network, the translated content being in an intermediate language;
conduct a fuzzy search using the translated textual content using a technique selected from Bitap, n-gram, Levenshtein Distance, BK-tree, and Soundex for similar translated content from a plurality of documents, wherein the similar translated content was previously stored in a database; and
output results of the comparison.

10. The system of claim 9, further comprising storing additional instructions that when executed by the one or more processors, are configured to cause the system to store the translated content in the database.

11. The system of claim 9, wherein content from the plurality of documents stored in the database has been previously summarized and translated into the intermediate language.

12. The system of claim 9, wherein outputting the results of the comparison comprises causing a user device to display the results of the comparison.

13. The system of claim 12, wherein each of the results comprise summarized textual content of an associated document of the plurality of documents.

14. The system of claim 9, wherein the intermediate language is lojban.

15. The system of claim 9, wherein the first neural network comprises a first recurrent neural network (RNN), a first convolutional neural network (CNN), a transformer, or a combination thereof.

16. The system of claim 15, wherein the second neural network comprises a second recurrent neural network (RNN), a second convolutional neural network (CNN), a transformer, or a combination thereof, and wherein the third neural network is an autoencoder.

17. A system, comprising:
one or more processors; and
memory in communication with the one or more processors and storing instructions that, when executed by the one or more processors, are configured to cause the system to:
receive text;
summarize the text using a first neural network;
translate the summarized text into translated content in an intermediate language using a second neural network;
generate n-grams for each word of the summarized text in the intermediate language;
conduct a fuzzy search using the generated n-grams for similar translated text from a plurality of documents, wherein the similar translated text was previously stored in a database; and
output results of the fuzzy search.

18. The system of claim 17, wherein the one or more identified documents are stored in a database and content from the one or more identified documents has been previously summarized and translated into translated content in the intermediate language.

19. The system of claim 18, wherein conducting the fuzzy search comprises comparing the translated content to the translated content of the one or more identified documents in the database.

* * * * *